United States Patent [19]

Kawamoto et al.

[11] Patent Number: 5,337,163

[45] Date of Patent: Aug. 9, 1994

[54] LINEAR IMAGE SENSOR WITH VARIED ELECTRIC CHARGE STORAGE TIME

[75] Inventors: Seiichi Kawamoto; Maki Sato; Tadakuni Narabu; Hisanori Miura, all of Kanagawa, Japan

[73] Assignee: Sony Corporation, Tokyo, Japan

[21] Appl. No.: 787,948

[22] Filed: Nov. 5, 1991

[30] Foreign Application Priority Data

Nov. 14, 1990 [JP] Japan .................. 2-309765

[51] Int. Cl.$^5$ .................. H04N 1/04; H04N 3/14
[52] U.S. Cl. .................. 358/482; 358/483; 348/297
[58] Field of Search .......... 358/483, 482, 494, 213.27, 358/213.29, 213.19, 213.26

[56] References Cited

U.S. PATENT DOCUMENTS

| 4,242,599 | 12/1980 | Suzuki | 358/213.19 |
| 4,737,841 | 4/1988 | Kinoshita et al. | 358/213.29 |
| 4,884,142 | 11/1989 | Suzuki | 358/213.19 |
| 5,043,818 | 8/1991 | Yokoyama | 358/213.29 |

FOREIGN PATENT DOCUMENTS 0382568 8/1990 European Pat. Off. .

Primary Examiner—Edward L. Coles, Sr.
Assistant Examiner—Kimberly A. Williams
Attorney, Agent, or Firm—Hill, Steadman & Simpson

[57] ABSTRACT

The present invention is directed to a linear image sensor, the electric charge storage time of which can be varied. According to an embodiment of the present invention, there is provided a linear image sensor in which a read-out gate and a charge-transfer gate are disposed on one side of an image sensor array, and a drain gate and a drain region are disposed on the other side of the image sensor array, whereby the electric charge storage time in which a signal charge is transferred by the charge-transfer register after the signal charge is read out by the application of a read-out signal to the read-out gate and the next read-out signal is applied to the read-out gate can be varied by varying the application timing of the drain gate signal. When the linear image sensor is applied to a facsimile, the output level can be adjusted and the light and shade can be controlled by varying the electric charge accumulation time in response to the change of light intensity of a light source or by the change of scan speed of the linear image sensor.

3 Claims, 3 Drawing Sheets

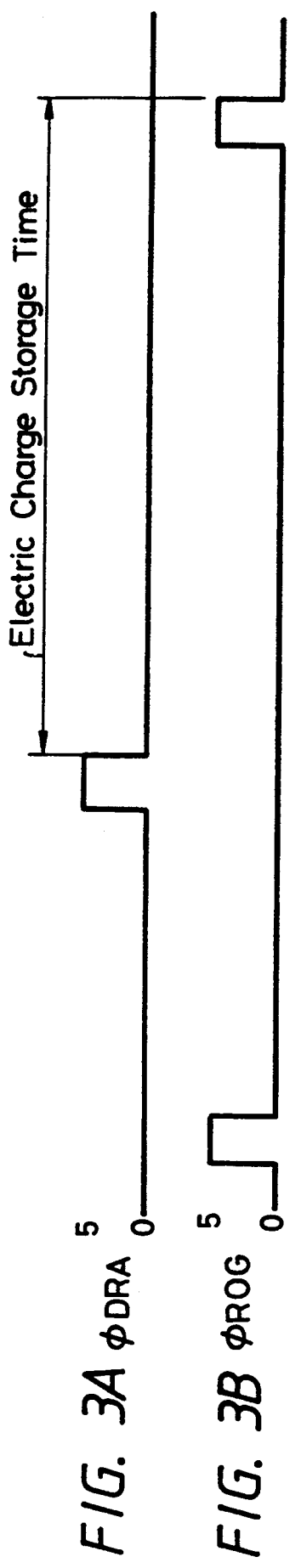
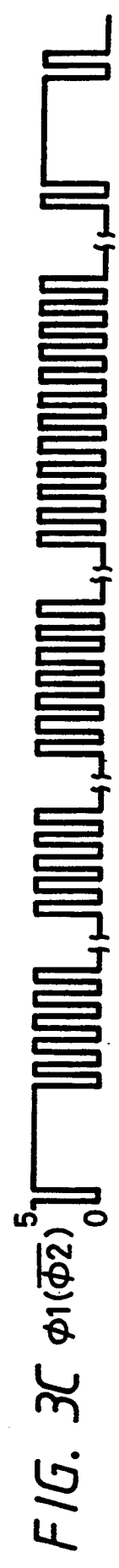
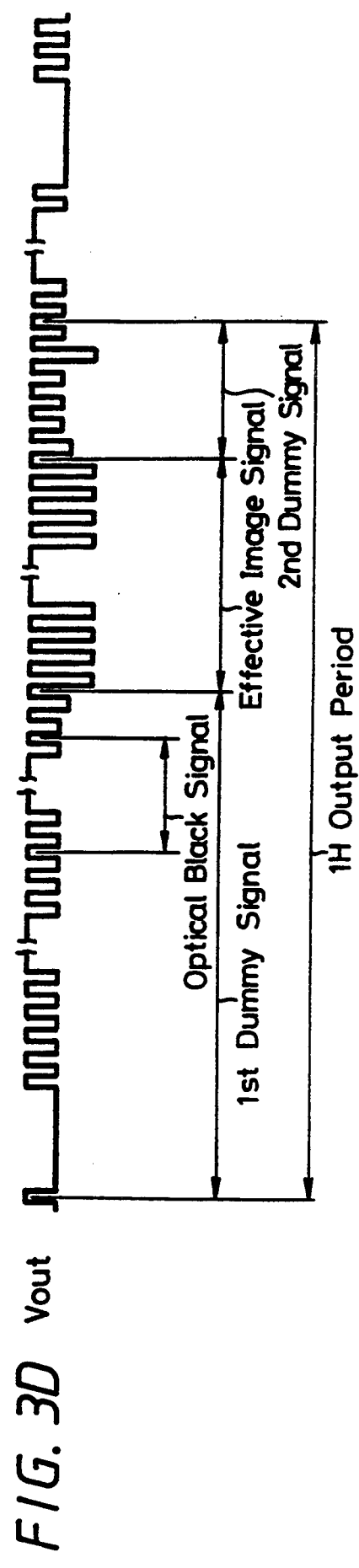
FIG. 3A $\phi_{DRA}$
FIG. 3B $\phi_{ROG}$
FIG. 3C $\phi_1(\overline{\phi_2})$
FIG. 3D $V_{out}$

LINEAR IMAGE SENSOR WITH VARIED ELECTRIC CHARGE STORAGE TIME

BACKGROUND OF THE INVENTION

1. Field of the Invention

The present invention generally relates to linear image sensors and, more particularly, to a linear image sensor whose electric charge storage time can be varied.

2. Description of the Prior Art

Linear image sensors have been frequently used as image readers for a copying machine, a facsimile and so on, for example. FIG. 1 shows an example of such linear image sensor according to the prior art.

Referring to FIG. 1, it will be seen that a plurality of image sensing elements 1, 1, . . . are arrayed to form an image sensor array 2. A charge-transfer register 3 formed of a charge-coupled device (CCD) is provided on one side of the image sensor array 2 by a small distance from the image sensor array 2. A read-out gate 4 is provided between the image sensor array 2 and the charge-transfer register 3.

In this conventional linear image sensor, electric charges stored in the respective image sensing elements 1, 1, . . . are read out through the under side of the read-out gate 4 to the charge-transfer register 3 by the application of the read-out signal, which turns on the read-out gate 4, to the read-out gate 4. Thereafter, the respective electric charges are transferred by the charge-transfer register 3 and output to the outside bit by bit.

Of the video camera apparatus having a large number of image sensor arrays, such one is known to have an electronic shutter function by disposing an overflow-drain and a gate on one side of each of the image sensor arrays (see Japanese Laid-Open Patent Publication No. 62-166661).

The conventional linear image sensor shown in FIG. 1 has the disadvantage such that an output level for the same object is fluctuated depending on the light intensity of a light source for the object. That is, fluorescent lamps are frequently employed as the light source for reading the object in the facsimile and the copying machine. The fluorescent lamp, however, has the drawback such that the light intensity thereof is considerably fluctuated due to aging change. As a consequence, due to the change of the light intensity of the light source, the output level for the same object is fluctuated.

Further, since the scanning speed of the conventional linear image sensor relative to the object is not constant, the storage time of electric charges is changed with the scanning speed so that the output level is unavoidably fluctuated.

OBJECTS AND SUMMARY OF THE INVENTION

Accordingly, it is an object of the present invention to provide an improved linear image sensor in which the aforementioned shortcomings encountered with the prior art can be eliminated.

More specifically, it is an object of the present invention to provide a linear image sensor of simplified arrangement in which a time for storing electric charges can be varied.

It is another object of the present invention to provide a linear image sensor which can adjust light and shade in reading an original document when applied to a facsimile.

According to an aspect of the linear image sensor of the present invention, the read-out gate and the charge-transfer register are disposed on one side of the image sensor array and the drain gate and the drain region are disposed on the other side of the image sensor array, wherein the charge storage time period in which after the read-out signal is applied to the read-out gate to read out signal charges, the signal charges are transferred by the charge-transfer register and the next read-out signal that is applied can be varied by the change of a timing at which the drain gate signal is applied to the drain gate. The reason for this is that the electric charges stored in the respective image sensing elements are discharged to the drain region by the application timing of the drain gate signal and then the storage of the electric charges is started again.

Further, according to the linear image sensor of the present invention, if the light intensity of the light source is strong, the charge storage time is reduced and if it is weak, the charge storage time is extended, thereby controlling the timing of the drain gate signal in such a manner that the same output level is produced for the same object. Further, it becomes possible to avoid the output level from being fluctuated by the scan speed of the linear image sensor relative to the object.

The preceding and other objects, features, and advantages of the present invention will become apparent from the following detailed description of an illustrative embodiment to be taken in conjunction with the accompanying drawings, in which like reference numerals are used to identify the same or similar parts.

BRIEF DESCRIPTION OF THE DRAWINGS

FIGS. 3A through 3D are respectively timing charts useful for explaining the operation of the embodiment of the present invention shown in FIG. 2.

DESCRIPTION OF THE PREFERRED EMBODIMENT

An embodiment of the linear image sensor according to the present invention will hereinafter be described in detail with reference to the drawings.

Figure 1:
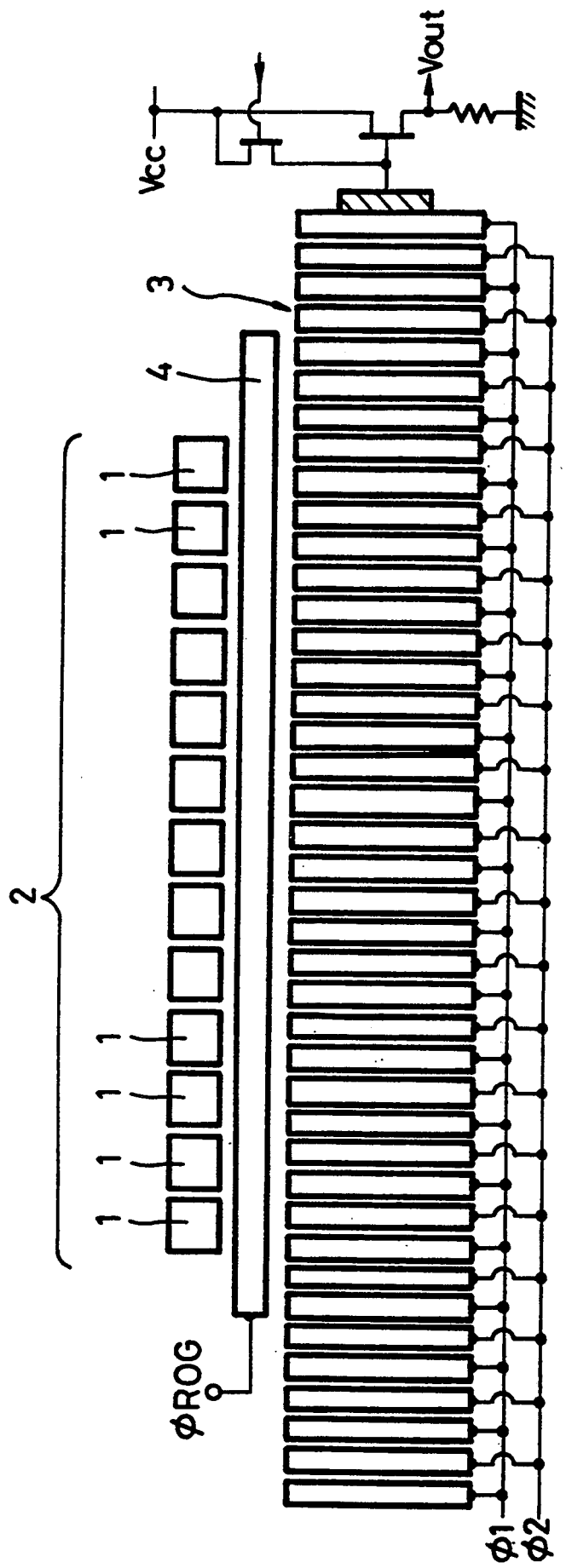
FIG. 1 is a circuit diagram showing an example of a linear image sensor according to the prior art.
Figure 2:
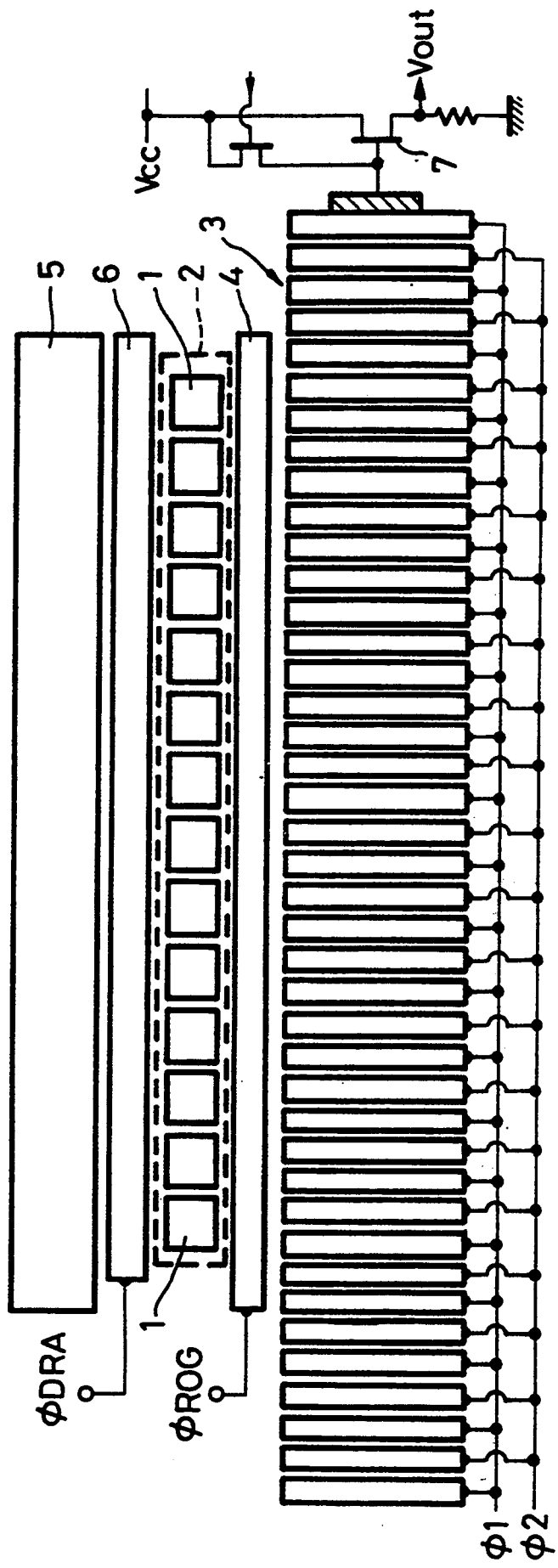
FIG. 2 is a circuit diagram showing an embodiment of a linear image sensor according to an embodiment of the present invention.

FIG. 2 shows a circuit diagram of the embodiment of the linear image sensor according to the present invention. In FIG. 2, like parts corresponding to those of FIG. 1 are marked with the same references and therefore need not be described in detail.

Referring to FIG. 2, it will be seen that the plurality of image sensing elements 1, 1, . . . are lined up (i.e., arrayed) to form the image sensor array 2. The charge-transfer register 3 formed of a CCD is disposed on one side of the image sensor array 2 with a small distance therefrom, and the read-out gate 4 is provided between the image sensor array 2 and the charge-transfer register 3.

A drain region 5 is disposed on the other side of the image sensor array 2 by a small distance from the latter and a drain gate 6 is provided on a portion between the drain region 5 and the image sensor array 2.

FIGS. 3A through 3D are respectively timing charts used to explain operation of the linear image sensor shown in FIG. 2.

Reference symbol $\phi$DRA in FIG. 3A depicts a drain gate signal applied to the drain gate 6, $\phi$ROG in FIG. 3B depicts a read-out signal applied to the read-out gate 4, and $\phi$1 in FIG. 3C depicts a charge-transfer pulse which is used to control the electrical charge-transfer operation of the charge-transfer register 3. In actual practice, another charge-transfer pulse of opposite phase is needed as the charge-transfer pulse and will not be illustrated herein because it has a completely opposite phase to that of the above charge-transfer pulse $\phi$1.

Operation of this linear image sensor of the present invention shown in FIG. 2 will be described below with reference to FIGS. 3A to 3D.

In the normal condition, the read-out gate 4 is closed (OFF state) so that electric charges are stored in the image sensing elements 1, 1, . . . When the read-out signal $\phi$ROG is applied to the read-out gate 4, signal charges stored in the image sensing elements 1, 1, . . . of the image sensor array 2 are read out therefrom to the charge-transfer register 3. When this reading operation is ended (i.e., the read-out signal $\phi$ROG disappears), the transfer of signal charges is started by the charge-transfer clock pulses $\phi$1, $\phi$2 through the charge-transfer register 3.

On the other hand, the storage of the signal charges is started in each of the image sensing elements 1, 1, . . . of the image sensor array 2. However, when the drain gate signal $\phi$DRA is input to the drain gate 6, signal charges stored up to that time in the image sensing elements 1, 1, . . . are discharged to the drain region 5 via the underside of the drain gate 6. Then, at the same time when the drain gate signal $\phi$DRA disappears, the storage of signal charges is started.

When the transfer of signal charges done by the charge-transfer register 3 is ended, then the read-out signal $\phi$ROG is applied to the read-out gate 4, whereby signal charges stored during the period from the application of the drain gate signal $\phi$DRA to the present time (time at which the application of the read-out signal $\phi$ROG is started) are read out to the charge transfer register 3. The signal charges thus read-out to the charge-transfer register 3 are supplied to a source-follower FET (field effect transistor) 7 which derives an output signal Vout which is illustrated in FIG. 3D. As shown in FIG. 3D, this output signal Vout is composed of a first dummy signal including an optical black signal, an effective image signal and a second dummy signal.

Accordingly, the charge storage time lasts from the OFF state of the drain gate signal $\phi$DRA to the ON state of the next read-out signal $\phi$ROG. Therefore, it is possible to vary the charge storage time by varying the timing of the charge storage time.

Thus, if the light intensity of the light source is strong, the charge storage time is reduced. Conversely, if the light intensity of the light source is weak, the charge storage time is extended, thereby the same output level being produced for the same object. In other words, it is possible to reduce dependence of the output signal level relative to the light intensity of the light source.

In the case of the facsimile in which the scan speed of the linear image sensor relative to the object is not constant, although one cycle time (cycle of the read-out signal) is changed, the charge storage time can be made constant or can be prevented from being considerably changed by properly controlling the timing of the drain-gate signal $\phi$DRA, thus making it possible to reduce dependence of the output signal level relative to the scan speed.

When the signal charges of the constant amount are stored in the drain region 5 by supplying the signal of a constant level to the drain region 5, that is, the drain region 5 is bias-charged and when the signal charges stored in the image sensor array 2 are read out to the charge-transfer register 3, the charge transfer efficiency can be enhanced by transferring the signal charges thus bias-charged in the drain region 5 to the image sensor array 2.

As described above, according to the linear image sensor of the present invention, the read-out gate and the charge-transfer register are disposed on one side of the image sensor array formed of a plurality of image sensing elements and the drain gate and the drain region are disposed on the other side of the above-mentioned image sensor array. Also, the charge storage time can be varied by the timing of the application of the drain-gate signal to the drain gate during a period from the charge transfer by the charge-transfer register after the application of the read-out signal to the read-out gate to the application of the next read-out signal.

Accordingly, if the light intensity of the light source is strong, the charge storage time is reduced, while if it is weak, the charge storage time is extended, thereby the same output level being produced to the same object. Further, it is possible to avoid the output level from being fluctuated by the scan speed of the linear image sensor relative to the object.

Having described the preferred embodiment of the invention with reference to the accompanying drawings, it is to be understood that the invention is not limited to that precise embodiment and that various changes and modifications thereof could be effected by one skilled in the art without departing from the spirits or scope of the invention as defined in the appended claims.

What is claimed is:

1. A linear image sensor comprising:
   (a) an image sensor array having a plurality of image sensing elements to produce signal charges and non-signal charges upon incidence of light rays;
   (b) a charge-transfer register disposed on one side of said image sensor array;
   (c) A read-out gate provided between said image sensor array and said charge-transfer register to transfer said signal charges produced in said image sensor array to said charge-transfer register;
   (d) a drain region disposed on the other side of said image sensor array;
   (e) a drain gate provided between said image sensor array and said drain region to transfer charges from said image sensor array to said drain region; and
   (f) means for supplying a drain gate signal to said drain gate to switch said drain gate to an ON state after said read-out gate is in an ON state, wherein the timing of said drain gate signal to said drain gate is variable to change the storage time of said plurality of image sensing elements; and
   wherein the storage time is determined by the timing difference between the drain gate signal and the read-out gate signal.

2. A linear image sensor comprising:

(a) an image sensor array having a plurality of image sensing elements to produce signal charges and non-signal charges upon incidence of light rays;
(b) a charge-transfer register disposed on one side of said image sensor array;
(c) A read-out gate provided between said image sensor array and said charge-transfer register to transfer said signal charges produced in said image sensor array to said charge-transfer register;
(d) a drain region disposed on the other side of said image sensor array;
(e) a drain gate provided between said image sensor array and said drain region to transfer charges from said image sensor array to said drain region; and
(f) means for supplying a drain gate signal to said drain gate to switch said drain gate to an ON state after said read-out gate is in an ON state, wherein the timing of said drain gate signal to said drain gate is variable to change the storage time of said plurality of image sensing elements; and
wherein the output signal of said charge-transfer register is used for a facsimile signal.

3. A linear image sensor comprising:

(a) an image sensor array having a plurality of image sensing elements to produce signal charges and non-signal charges upon incidence of light rays;
(b) a charge-transfer register disposed on one side of said image sensor array;
(c) A read-out gate provided between said image sensor array and said charge-transfer register to transfer said signal charges produced in said image sensor array to said charge-transfer register;
(d) a drain region disposed on the other side of said image sensor array;
(e) a drain gate provided between said image sensor array and said drain region to transfer charges from said image sensor array to said drain region; and
(f) means for supplying a drain gate signal to said drain gate to switch said drain gate to an ON state after said read-out gate is in an ON state, wherein the timing of said drain gate signal to said drain gate is variable to change the storage time of said plurality of image sensing elements; and
wherein charges in said drain region are transferred to said image sensor array while said signal charges stored in said image sensor array are read out to said charge-transfer register.

* * * * *